United States Patent
Miura

(10) Patent No.: US 9,712,344 B2
(45) Date of Patent: Jul. 18, 2017

(54) RECEIVING DEVICE WITH ERROR DETECTION CIRCUIT

(71) Applicant: THINE ELECTRONICS, INC., Tokyo (JP)

(72) Inventor: Satoshi Miura, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 40 days.

(21) Appl. No.: 14/712,298

(22) Filed: May 14, 2015

(65) Prior Publication Data
US 2015/0333869 A1 Nov. 19, 2015

(30) Foreign Application Priority Data
May 16, 2014 (JP) ................. 2014-102335

(51) Int. Cl.
*G06F 11/00* (2006.01)
*H04L 25/02* (2006.01)
*H04L 1/00* (2006.01)
*G06F 11/07* (2006.01)

(52) U.S. Cl.
CPC ...... *H04L 25/0292* (2013.01); *G06F 11/0706* (2013.01); *G06F 11/0751* (2013.01); *H04L 1/0045* (2013.01); *H04L 25/0272* (2013.01)

(58) Field of Classification Search
CPC . H04L 1/0045; G06F 11/0751; G06F 11/0706
See application file for complete search history.

(56) References Cited

U.S. PATENT DOCUMENTS

| | | | | |
|---|---|---|---|---|
| 6,628,223 | B2 * | 9/2003 | Nagano | H04L 25/0272 326/30 |
| 7,038,485 | B2 * | 5/2006 | Nakashima | H04L 25/0278 326/16 |
| 7,205,789 | B1 * | 4/2007 | Karabatsos | G11C 5/04 326/30 |
| 7,573,299 | B2 * | 8/2009 | Watarai | H04L 25/0276 326/82 |
| 7,768,312 | B2 * | 8/2010 | Hirose | H03K 19/00384 326/83 |
| 8,775,891 | B2 * | 7/2014 | Ichimiya | H04L 1/1854 714/749 |
| 9,281,969 | B2 * | 3/2016 | Gondi | H04L 25/028 |

FOREIGN PATENT DOCUMENTS

JP 2008-219813 A 9/2008

* cited by examiner

*Primary Examiner* — Esaw Abraham
(74) *Attorney, Agent, or Firm* — Sughrue Mion, PLLC

(57) ABSTRACT

A receiving device includes a termination circuit to which a received signal is input, a processing circuit which performs a process at a rear stage of the termination circuit, and an error detection circuit which detects an error contained in the received signal. In a case where the error is detected by the error detection circuit, a termination resistance value of the termination circuit is lowered. Therefore, the receiving device can be rapidly restored when a signal containing an error is received.

6 Claims, 3 Drawing Sheets

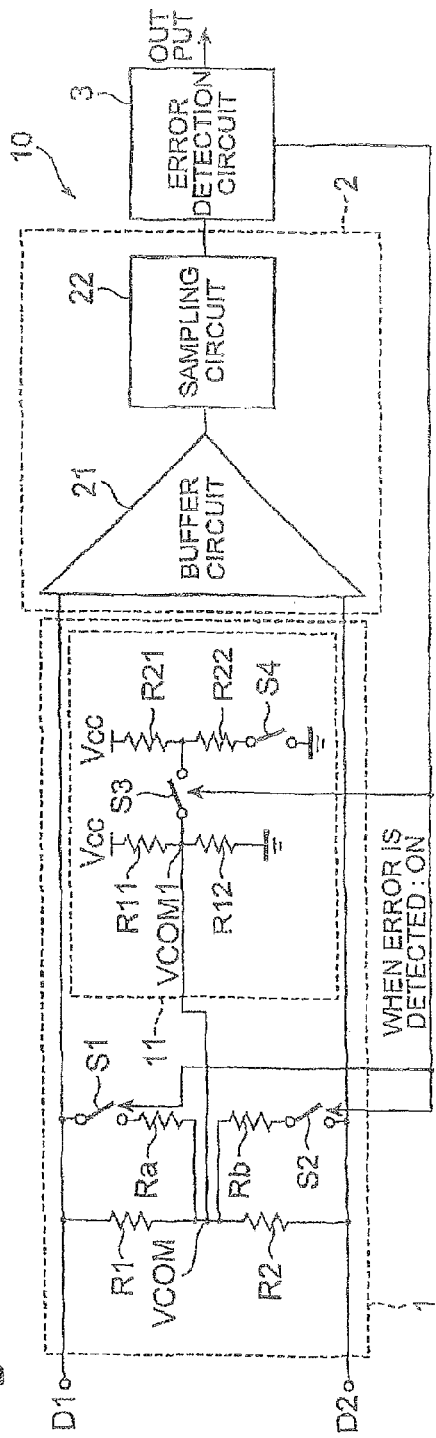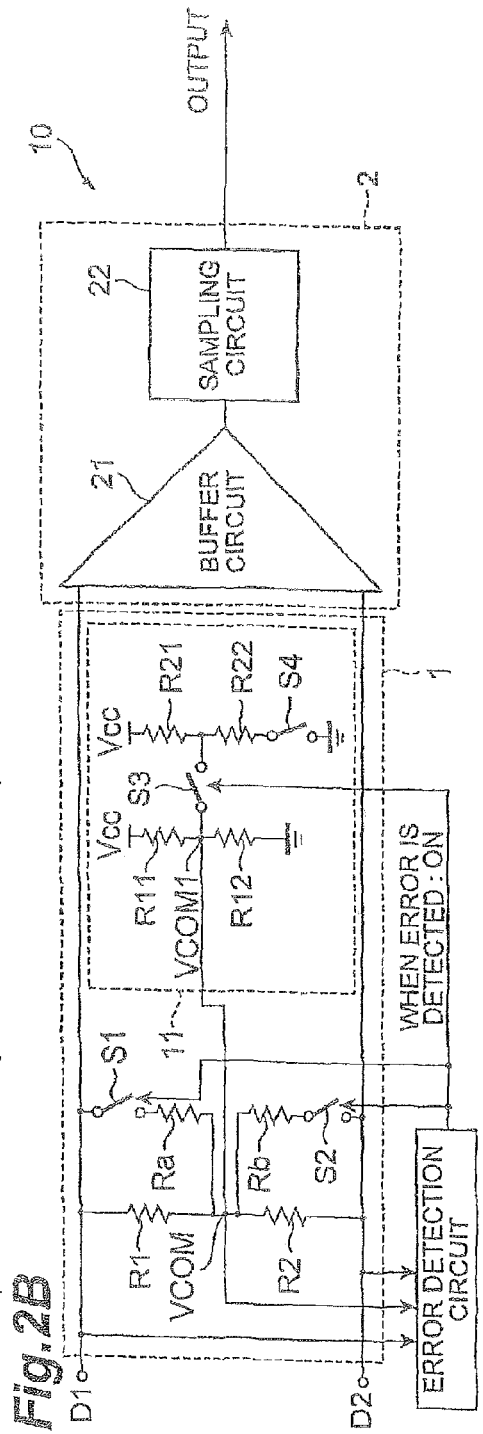

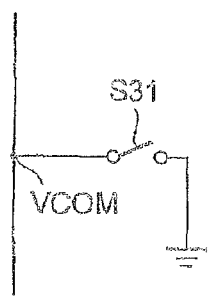
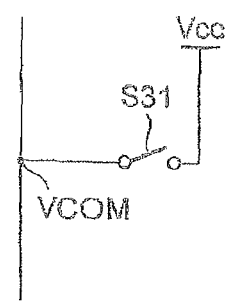
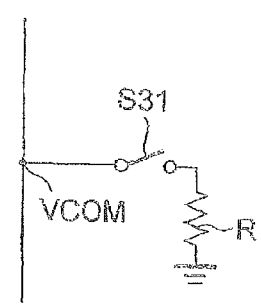
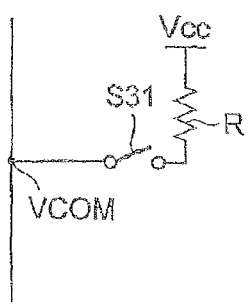
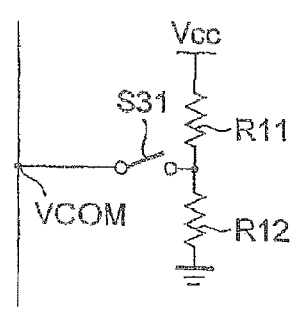
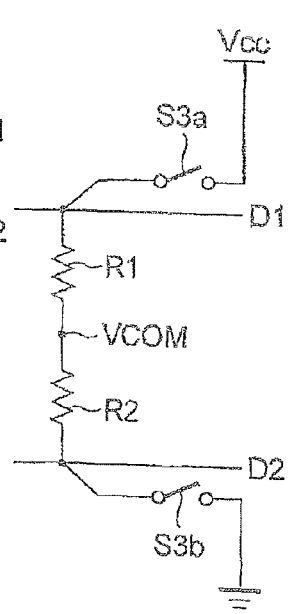
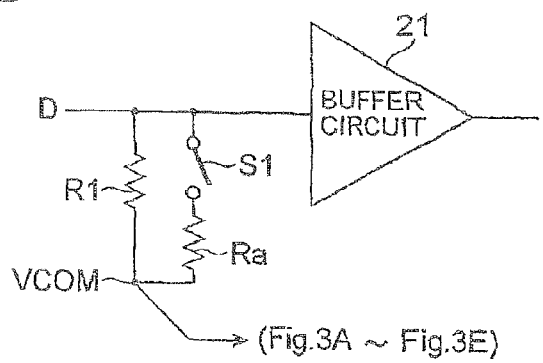

RECEIVING DEVICE WITH ERROR DETECTION CIRCUIT

BACKGROUND OF THE INVENTION

Field of the Invention

The present invention relates to a receiving device which is rapidly restored when a signal containing an error is received.

Related Background Art

Conventionally, a receiving circuit is proposed which prevents a reception error and the like in a case where a signal transmitted from a transmitting device is received (for example, see Patent Document 1). In such a signal transmission, for example, a modulation is performed in consideration of a run length or a DC balance, and then the signal is transmitted from the transmitting device. Then, after the signal is received in a receiving device, and data is demodulated. In such a communication method, it is known that noise resistance is strong.

(Patent Document 1) Japanese Patent Application Laid-Open No. 2008-219813 A

SUMMARY OF THE INVENTION

However, in a case where an extraneous noise (in particular, a discharging noise) is applied to a transmission path, charges are accumulated in the transmission path, and an error occurs in a circuit at the rear stage, but it is taken a time for restoration to a normal state.

The invention has been made in view of such a circumstance, and an object thereof is to provide a receiving device which is rapidly restored when a signal containing an error is received.

In order to solve the problem, according to a first aspect of the invention, there is provided a receiving device including: a termination circuit configured to input a received signal therein; a processing circuit configured to perform a process at a rear stage of the termination circuit; and an error detection circuit configured to detect an error contained in the received signal, wherein in a case where the error is detected by the error detection circuit, a termination resistance value of the termination circuit is lowered.

According to the receiving device, the charges accumulated in the transmission path on the input side of the receiving device can be rapidly discharged by lowering a termination resistance value, so that the receiving device can be rapidly restored.

According to a second aspect of the invention, the error detection circuit is positioned at the rear stage of the processing circuit.

According to a third aspect of the invention, the error detection circuit determines whether a pattern of the received signal is normal, and outputs the fact that there is an error in a case where it is determined that the pattern is not normal as a determination result.

According to a fourth aspect of the invention, in a case where the same values contained in the received signal are consecutive by a specific number or more, the error detection circuit determines that the pattern of the received signal is not normal.

According to a fifth aspect of the invention, the error detection circuit samples the received signal by a frequency higher than a repetition frequency, and in a case where a pattern of the sampled value contains an abnormal pattern, the error detection circuit determines that the pattern of the received signal is not normal.

According to a sixth aspect of the invention, the error detection circuit is positioned at the front stage of the termination circuit or the processing circuit. According to a seventh aspect of the invention, the error detection circuit detects a voltage of a transmission path through which the signal is transmitted to the termination circuit, and in a case where the detected voltage does not fall within a specific range, the error detection circuit outputs the fact that there is an error.

According to an eighth aspect of the invention, the received signal is a differential signal which is transmitted by two transmission paths, the termination circuit includes a resistor network configured to be connected to a node between the transmission paths, and in a case where an error is detected by the error detection circuit, a resistance value of the resistor network is lowered.

According to a ninth aspect of the invention, there is provided a receiving device including: a termination circuit configured to input a received signal therein; a processing circuit configured to perform a process at a rear stage of the termination circuit; and an error detection circuit configured to detect an error contained in the received signal, wherein in a case where the error is detected by the error detection circuit, a transmission path is connected to a fixed potential such that charges accumulated in the transmission path on an input side connected to the termination circuit are discharged. When the transmission path is connected to the fixed potential, the charges accumulated in the transmission path are rapidly discharged, so that the receiving device can be rapidly restored to the normal state.

According to the receiving device of the invention, the receiving device can be rapidly restored when a signal containing an error is received.

BRIEF DESCRIPTION OF THE DRAWINGS

FIG. 2A is a circuit diagram illustrating a detailed structure of the receiving device;

FIG. 2B is a circuit diagram illustrating a detailed structure of the receiving device;

FIG. 3A is a circuit diagram illustrating a modified example of a termination circuit;

FIG. 3B is a circuit diagram illustrating a modified example of the termination circuit;

FIG. 3C is a circuit diagram illustrating a modified example of the termination circuit;

FIG. 3D is a circuit diagram illustrating a modified example of the termination circuit;

FIG. 3E is a circuit diagram illustrating a modified example of the termination circuit;

FIG. 3F is a circuit diagram illustrating a modified example of the termination circuit; and FIG. 3G is a circuit diagram illustrating a modified example of the termination circuit.

DESCRIPTION OF THE PREFERRED EMBODIMENTS

Hereinafter, a receiving device according to an embodiment will be described. The same elements are denoted with the same symbols, and a redundant description will not be repeated.

Figure 1A:
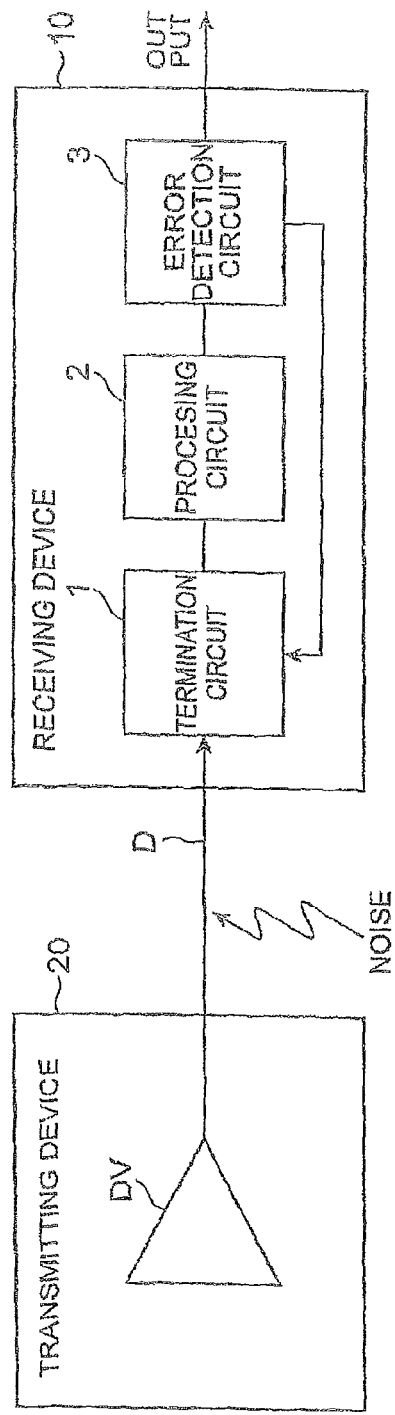
FIG. 1A is a block diagram of a transceiver system which includes a receiving device.
Figure 1B:
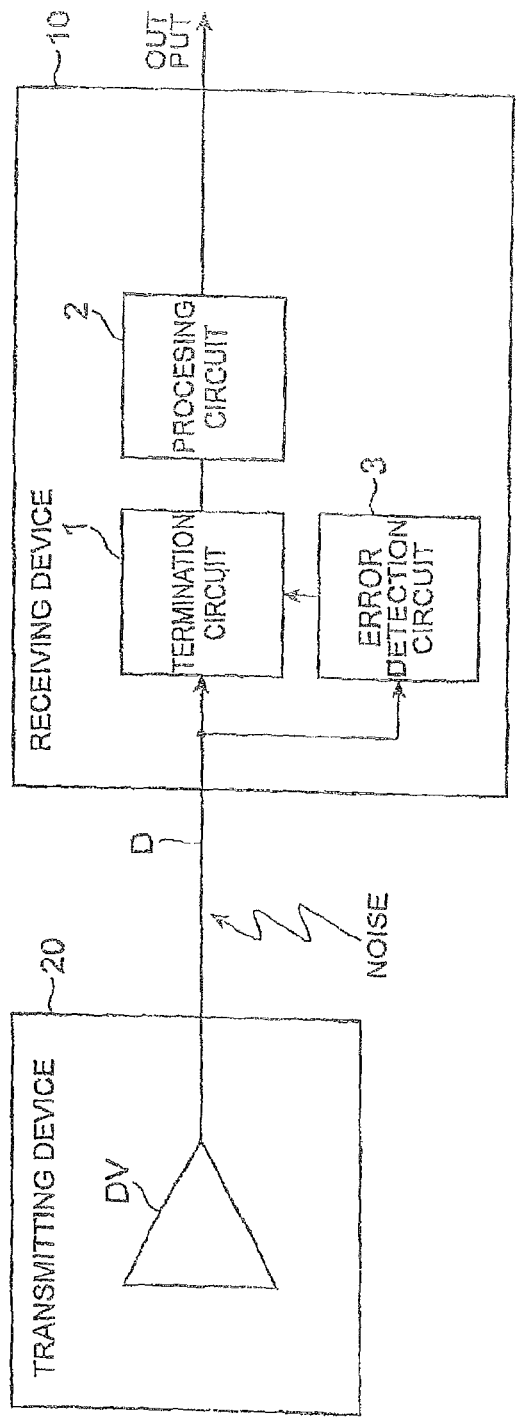
FIG. 1B is a block diagram of the transceiver system which includes the receiving device.

FIGS. 1A and 1B are block diagrams of a transceiver system which includes a receiving device 10 and a transmitting device 20.

The receiving device 10 receives a signal transmitted from the transmitting device 20. The transmitting device 20 includes a drive circuit DV which performs an encoding of the signal in a reference clock. The signal transmitted from the transmitting device 20 is propagated into a transmission path D and is input to the receiving device 10.

The receiving device 10 includes a termination circuit 1 to which the received signal is input, a processing circuit 2 which performs a process at the rear stage of the termination circuit 1, and an error detection circuit 3 which detects an error contained in the received signal. In this device, in a case where the error is detected by the error detection circuit 3, a termination resistance value of the termination circuit 1 is lowered. FIG. 1A illustrates a configuration in a case where the error detection circuit 3 is positioned at the rear stage of the processing circuit 2, and FIG. 1B illustrates a configuration in which the error detection circuit 3 is positioned at the front stage of the termination circuit 1 or the processing circuit 2.

The termination circuit 1 which includes a termination resistor is disposed at the end stage of the transmission path D through which the signal is transmitted, and the same resistance value as a characteristic impedance of the transmission path is attached in many circuits. In the conventional device, this resistance value is defined in standards (for example, USB, VbyOneHS, PCIe, etc.), which is not changeable. In addition, since power consumption is increased as the resistance value is decreased, there is no attempt to change the resistance value to be lowered in the related art.

In this embodiment, the receiving device 10 includes an error detection circuit 3 which detects an error occurring according to a noise, and detects an extraneous noise (in particular, whether a discharging noise is introduced). In a case where the error is detected, the resistance value of the termination resistor is lowered. Further, when an encoding or transmission data restriction in the transmitting device 20 is used, the error is easily detected, and sensibility of error detection can be increased.

Therefore, when an unexpected noise such as the extraneous noise (in particular, the discharging noise) is introduced in a state where a transmission standard is satisfied and a normal power consumption is not increased, the data transmission is rapidly restored and as a result the transmission performance can be improved.

In a case where the discharging noise and the like are superimposed in the transmission path D, charges are accumulated in the transmission path D and the potential of the transmission path D is changed, and thus an error occurs in the circuit at the rear stage. In a case where an error is detected in the error detection circuit 3, the signal is retransmitted from the transmitting device 20, but a normal signal transmission is difficult in a state where the transmission path D is charged up. Therefore, in a case where the error is detected by the error detection circuit 3, the termination resistance value of the termination circuit 1 is lowered.

In this case, the charges accumulated in the transmission path are rapidly discharged, and the transmission path can be rapidly restored to the state of a normal potential.

In FIG. 1A, the error detection circuit 3 is positioned at the rear stage of the processing circuit 2. With the error detection circuit 3 disposed at the rear stage, an error contained in the signal is easily detected in actual compared to a case where the error detection circuit 3 is disposed at the front stage. As a method of detecting an error, there are known various methods.

For example, the transmitting device 20 has an encoded signal for determining whether the pattern of a signal is a normal pattern or an abnormal pattern, and the error detection circuit 3 determines whether the pattern of the received signal is normal. In a case where it is determined that the pattern is not normal as a determination result, the fact that the signal has an error is output.

Such types of methods are known.

The error detection circuit 3 of FIG. 1A samples the received signal with a frequency higher than the repetition frequency thereof. In a case where the pattern of the sampled value contains the abnormal pattern, the error detection circuit 3 determines that the pattern of the received signal is not normal. Further, in a case where the same values contained in the received signal are consecutively detected by a specified number or more, the error detection circuit 3 can also determine that the pattern of the received signal is not normal.

Besides, in a case where an encoding restricted in a run length of the sampled data is used, the run length may be detected by the error detection circuit 3 on a reception side.

In addition, as illustrated in FIG. 1B, the error detection circuit 3 may be positioned at the front stage of the processing circuit 2 or the termination circuit 1. In this case, the error detection circuit 3 detects a voltage of the transmission path D through which the signal is transmitted to the termination circuit 1, and in a case where the detected voltage does not fall within a specified range, the error detection circuit 3 can output the fact that the error occurs.

FIGS. 2A and 2B are circuit diagram illustrating a detailed structure of the receiving device. The above-mentioned transmission path D is illustrated by two transmission paths D1 and D2 in FIGS. 2A and 2B.

As a method of changing the above-mentioned termination resistance value to be lowered, a resistor network 11 may be used. In this case, in the receiving device 10, the received signal is a differential signal transmitted by two transmission paths D1 and D2.

The termination circuit 1 is provided between the transmission path D1 and the transmission path D2. The termination circuit 1 is provided with resistors R1 and R2 which are connected between the transmission path D1 and the transmission path D2 in series. The resistor network 11 is connected at a connection point (a node) VCOM between the resistor R1 and the resistor R2 (that is, the node VCOM between the transmission paths). In the resistor network 11, in a case where an error is detected by the error detection circuit 3, the resistance value of the resistor network 11 is changed to be lowered.

The resistor R1 is connected in parallel with a resistor Ra and a switch S1 between the transmission path D1 and the node VCOM. In addition, a resistor R2 is connected in parallel with a resistor Rb and a switch S2 between the transmission path D2 and the node VCOM. The node VCOM is connected to a node VCOM1 in the resistor network 11.

A resistor R11 is connected between the node VCOM1 and a power source Vcc, a resistor R12 is connected between the node VCOM1 and the ground, and the node VCOM1 is connected to the power source Vcc through a switch S3 and a resistor R21. In addition, the node VCOM1 is connected to the ground through the switch S3, a resistor R22, and a switch S4 sequentially.

In a case where an error is detected by the error detection circuit 3, the error detection circuit 3 turns on the switches S1, S2, S3, and S4 in FIG. 2A to lower the resistance value of the combined resistors, and thus the termination resistance value of the termination circuit 1 is lowered. In a case where there is no error detected, all of these switches S1, S2, S3, and S4 are turns off. Further, in a case where the switch S4 is turned off at a normal time, there is no current flowing to the resistor R21 and the resistor R22, so that it is possible to save the power consumption.

A preferred magnitude relation between the resistors R1, R2, Ra, Rb, R11, R12, R21, and R22, for example, may satisfy settings such that the resistors R1 and Ra are almost the same value, the resistors R2 and Rb are almost the same value, R1=R2, Ra=Rb, and R11:R12=R21:R22, but various other settings can be modified in the invention. Further, regarding a relation between the parameters shown by almost the same and the equal sign, the value of one parameter may be equal to the other parameter±30%.

When the resistance value of the resistor network 11 is changed to be lowered, the potential of the transmission path D (D1 and D2) can be controlled, and the termination resistance value is rapidly changed, so that the charges accumulated in the transmission path D (D1 and D2) can be discharged.

Further, the processing circuit 2 of this example includes a buffer circuit 21 and a sampling circuit 22, and may use another processing circuit such as an encoder. The signals of the transmission paths D1 and D2 are input to the sampling circuit 22 through the buffer circuit 21, and in the case of FIG. 2A, the received signal is output as a digital value through the error detection circuit 3. The error detection circuit 3 turns on the switches S1 to S4 in a case where an error is detected.

In addition, in the case of FIG. 2B, the error detection circuit 3 detects a voltage between the transmission paths D1 and D2. In a case where the detected voltage does not fall within a specific range, the error detection circuit 3 outputs the fact that there is an error, and turns on the switches S1 to S4. The error detection circuit 3 detects a potential at the node VCOM, and in a case where the detected voltage does not fall within the specific range, the error detection circuit 3 may output the fact that there is an error, and turns on the switches S1 to S4.

Further, a method of changing a resistance value at the end point is as follows, but other methods may be considered.

FIG. 3 is a circuit diagram illustrating a modified example of the termination circuit.

FIG. 3A illustrates an example in which the above-mentioned node VCOM is connected to the ground through a switch S31, and the switch S31 is turned on at the time when an error is detected and turned off at the normal time.

FIG. 3B illustrates an example in which the above-mentioned node VCOM is connected to the power source Vcc through the switch S31, and the switch S31 is turned on at the time when an error is detected and turned off at the normal time.

FIG. 3C illustrates an example in which the above-mentioned node VCOM is connected to the ground through the switch S31 and the resistor R, and the switch S31 is turned on at the time when an error is detected and turned off at the normal time.

FIG. 3D illustrates an example in which the above-mentioned node VCOM is connected to the power source Vcc through the switch S31 and the resistor R, and the switch S31 is turned on at the time when an error is detected and turned off at the normal time.

FIG. 3E illustrates an example in which the above-mentioned node VCOM is connected to the power source Vcc through the switch S31 and the resistor R11 and to the ground through the switch S31 and the resistor R12, and the switch S31 is turned on at the time when an error is detected and turned off at the normal time.

In addition, as illustrated in FIG. 3F, the charges accumulated in the transmission path may be directly discharged.

In other word, the receiving device includes the termination circuit 1 to which the received signal is input, the processing circuit 2 which performs a process at the rear stage of the termination circuit 1, and the error detection circuit 3 which detects an error contained in the received signal. In a case where an error is detected by the error detection circuit 3, the transmission paths D1 and D2 are connected to a fixed potential such that the charges accumulated in the transmission paths D1 and D2 on the input side connected to the termination circuit 1 are discharged. The transmission path D1 is connected to the power source Vcc through a switch S3a, and the transmission path D2 is connected to the ground through a switch S3b. When the transmission path D is connected to the fixed potential, the charges accumulated in the transmission paths D1 and D2 are rapidly discharged, so that the receiving device 10 can be rapidly restored to the normal state. The switch S3a and the switch S3b are turned on at the time when the error is detected, and turned off in other normal states.

Further, in the above configuration, the description has been made about the case of the differential input, but the invention may be applied even to a case where the signal is simply input to the buffer circuit 21 through the transmission path. In other word, as illustrated in FIG. 3G, the resistor R1 is connected in parallel with the resistor Ra and the switch S1 between the transmission path D and the node VCOM, and the circuit configurations of FIGS. 3A to 3E can be connected at the node VCOM.

Further, the potential at the node VCOM is determined by the resistor network 11. Even when the resistance value is lowered, the potential at the node VCOM can be kept constant, so that the transmission is effectively rapidly restored.

Hitherto, as described above, according to the above-mentioned circuit configurations, the charges are discharged from the termination circuit 1 according to the termination resistance value by lowering the termination resistance value only at the time when the error is detected. The data is not possible to be normally transmitted until the charges are discharged, and the data can be transmitted again after the charges are discharged. As the termination resistance value is increased, it taken time until the data is normally restored again, but since the termination resistance value is small in the invention, the time taken for discharging the charges is shortened to satisfy the standard and improve a convergence property of the voltage without changing the power needed at the time of the normal operation, and to improve the transmission performance.

What is claimed is:
1. A receiving device comprising:
   a termination circuit configured to input a received signal therein;
   a processing circuit configured to perform a process at a rear stage of the termination circuit; and
   an error detection circuit configured to detect an error contained in the received signal, wherein in a case where the error is detected by the error detection circuit, a termination resistance value of the termination circuit is lowered to discharge charges accumulated in a transmission path on an input side of the termination circuit.

2. The receiving device according to claim 1, wherein the error detection circuit is positioned at the rear stage of the processing circuit.

3. The receiving device according to claim 1, wherein the error detection circuit determines whether a pattern of the received signal is normal, and outputs the fact that there is an error in a case where it is determined that the pattern is not normal as a determination result.

4. The receiving device according to claim 3, wherein in a case where the same values contained in the received signal are consecutive by a specific number or more, the error detection circuit determines that the pattern of the received signal is not normal.

5. The receiving device according to claim 3, wherein the error detection circuit samples the received signal by a frequency higher than a repetition frequency, and wherein in a case where a pattern of the sampled value contains an abnormal pattern, the error detection circuit determines that the pattern of the received signal is not normal.

6. The receiving device according to claim 1, wherein the received signal is a differential signal which is transmitted by two transmission paths, wherein the termination circuit includes a resistor network configured to be connected to a node between the transmission paths, and wherein in a case where an error is detected by the error detection circuit, a resistance value of the resistor network is lowered.

* * * * *